UNITED STATES PATENT OFFICE.

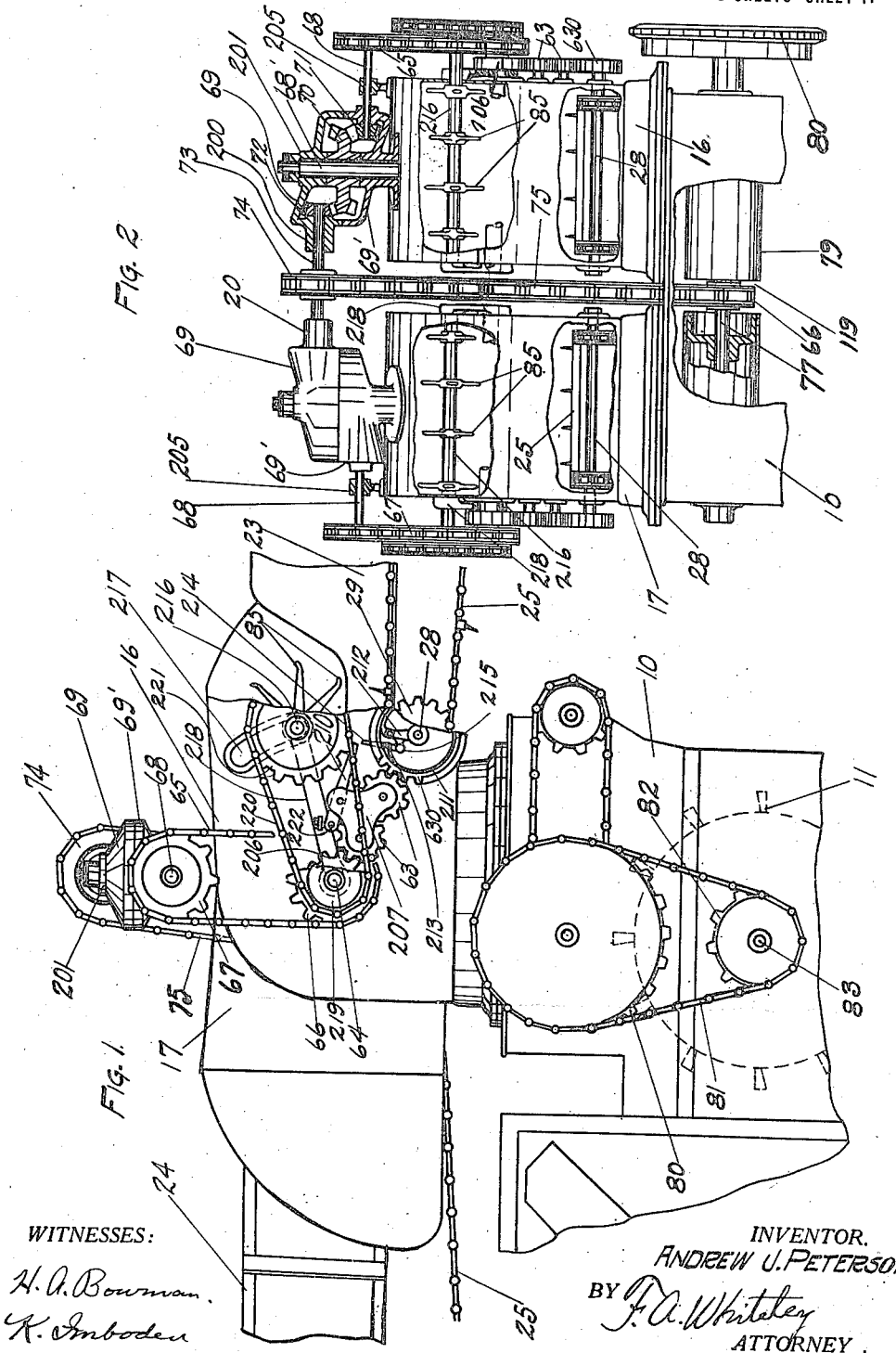

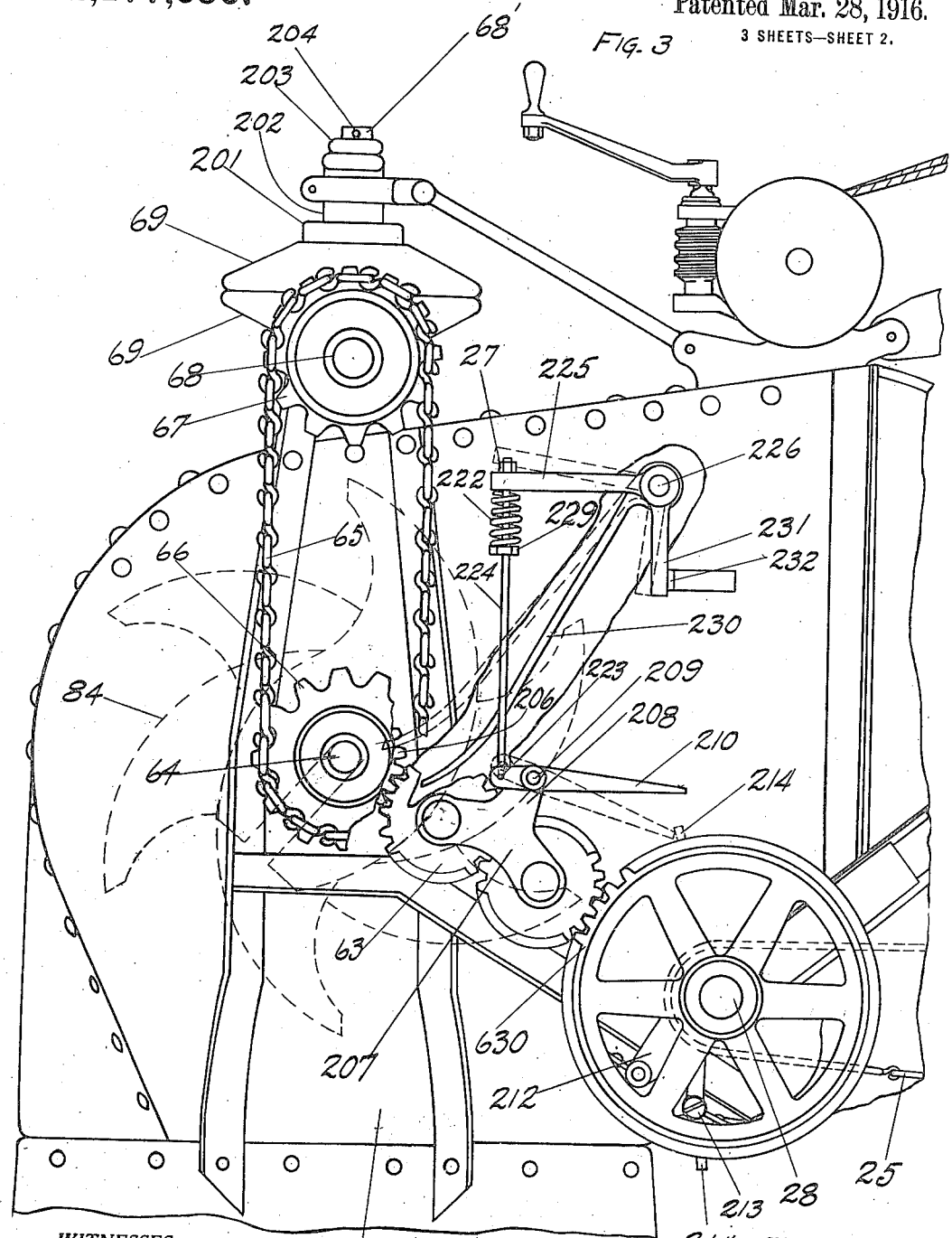

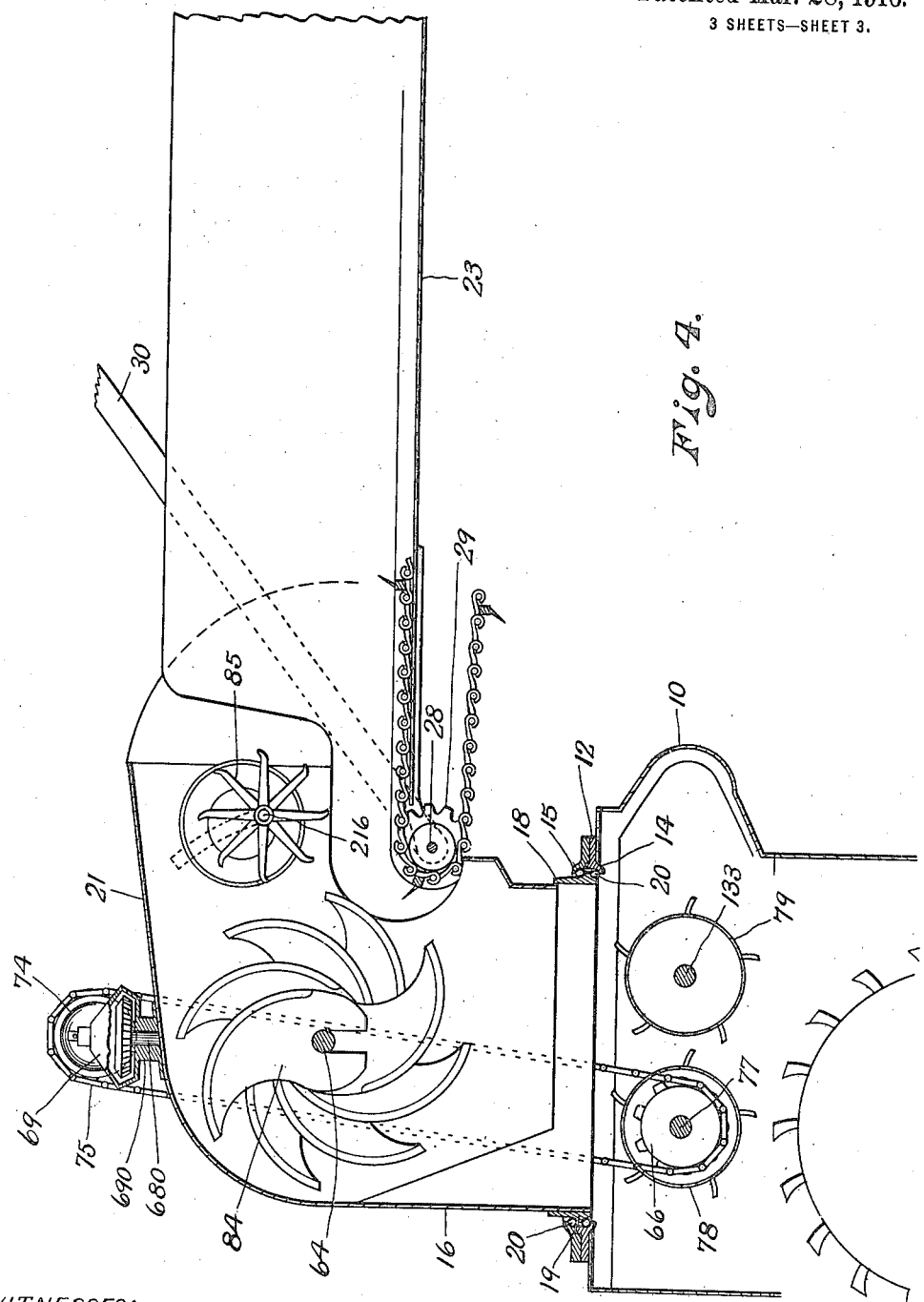

ANDREW J. PETERSON, OF ISANTI, MINNESOTA, ASSIGNOR TO TWIN CITY FEEDER MANUFACTURING COMPANY, OF MINNEAPOLIS, MINNESOTA, A CORPORATION.

FEEDER MECHANISM FOR THRESHING-MACHINES.

1,177,050.  Specification of Letters Patent.  Patented Mar. 28, 1916.

Application filed June 12, 1914. Serial No. 844,684.

*To all whom it may concern:*

Be it known that I, ANDREW J. PETERSON, a citizen of the United States, residing at Isanti, in the county of Isanti and State of Minnesota, have invented certain new and useful Improvements in Feeder Mechanism for Threshing-Machines, of which the following is a specification.

My invention relates to feeder mechanism for threshing machines and has for its object to provide efficient means for delivering bundles of grain and for cutting the bands and governing the rate of delivery of said bundles.

My invention is applied particularly to feeder and carrier mechanism of the type shown and described in my application, Serial Number 710,858, filed July 22, 1912, and in applications of even date herewith for bundle delivery mechanism for threshing machines, and feeders for grain separators.

In the aforesaid applications the bundles are delivered vertically downward to the threshing cylinder through a hood or hoods mounted so as to rotate in a horizontal plane upon the front of the separator.

The subject matter of the present invention relates to the means for driving the bundle delivery means and the band cutter on the several hoods, and for controlling said drive by the rate of feed of bundles so that the feeder cannot be overfed, the controlling means and the band cutters both operating to feed out the straw of the bundles when the carriers have been checked by overfeeding.

The full objects and advantages of my invention will appear in connection with the detailed description thereof and are particularly pointed out in the claims.

In the drawings, illustrating the application of my invention in one form,—Figure 1 is a side elevation of a portion of the complete feeder mechanism in position upon the front of a separator. Fig. 2 is an end view taken from the rear of the feeder of the parts shown in Fig. 1. Fig. 3 is a side elevation on an enlarged scale of some parts shown in Fig. 1 together with a modified feeder control mechanism. Fig. 4 is a side sectional elevation of a portion of the device.

As illustrated, a casing 10 is mounted upon the front of the separator above the threshing cylinder, indicated in dotted lines at 11. Journaled upon casing 10, side by side to rotate in horizontal planes, are a pair of hoods 16 and 17, respectively, to which are connected carriers 23 and 24. As pointed out in the aforesaid applications, the hoods rotate freely about vertical axes so as to extend the carriers in any angular direction desired relative to the separator. Rollers 78 and 79 are journaled in the casing 10. Shaft of roller 78 has thereon a sprocket gear 80, by means of which said roller is positively driven through sprocket chain 81 from a sprocket wheel 82 on the shaft 83 of the threshing cylinder 11. As shown in Fig. 2, the roller 79 is separated into two parts at 119, and the shaft 77 thereof has thereon a sprocket wheel 66 over which runs a sprocket chain 75 which runs over a sprocket wheel 74 fast on a transverse shaft 73. The shaft 73, as clearly shown in Fig. 2, is journaled at its opposite ends in boxes 200 on cap-piece casting 69. The caps 69 rest upon the lower castings 69' which are rigidly secured to the tops of the hoods 16 and 17. Rigidly secured in lower castings 69' are vertical shafts 68'. The shafts 68' extend through hubs 201 at the center of cap castings 69 and hold said cap castings in position upon the lower casting 69'. A sleeve 202 is journaled upon shafts 68' above hub 201, and a washer 203 and pin 204 extending through shaft 68' holds the sleeve 202 and the cap castings 69 beneath it from upward movement on shaft 68'. It will thus be seen that the shaft 73 is held in fixed position relative to hoods 16 and 17 and extending within the casings formed of members 69 and 69', while at the same time said hoods are free to rotate about their vertical axes extending through shaft 68'.

A double gear 70 is journaled upon each of shafts 68', as shown in Fig. 2. The upper teeth of bevel gear 70 mesh with a bevel pinion 72 on the end of shaft 73, while the lower teeth of the bevel gear 70 correspondingly mesh with a bevel pinion 71 on a horizontal shaft 68 having bearings in the lower casting 69' and in bearing-pieces 205 secured to the sides of hoods 16 and 17. Upon the ends of shafts 68 are sprocket wheels 67, over which runs a sprocket chain 65 which also engages a sprocket wheel 66 on a shaft 64 mounted transversely across each of hoods 16 and 17. Upon the shaft 64 is secured the band cutter 84, consisting of a plurality of interchangeable curved knives, as is well-known. The band cutter is thus at all times positively driven from the drive shaft 83 of the threshing cylinder through the connecting gearing above described whatever the position of the hoods and carriers in reference to the threshing cylinder.

Within the carriers 23 and 24, as partially shown in Fig. 1, are endless conveyer belts 25, by which the bundles are conveyed into the hoods 16 or 17 and beneath moving knives of the band cutter 84. As best shown in Fig. 4, it will be observed that the bundles are carried into the hoods, so that they move directly against the moving band cutter knives which not only operate to cut the bands, but to turn the straw of the bundles downwardly so as to direct the same between rollers 78 and 79. The carriers comprise sprocket chains which run over sprocket wheels 29 on shafts 28 journaled at the front of the hoods 16 and 17, a portion of each shaft 28 extending outside of its hood away from the central drive chain 75, and having thereon a spur gear 630 driven by intermediate idlers 63 from a spur gear 206 fast on shaft 64. The idlers 63 are journaled upon the outside of the hoods 16 and 17, respectively, and connected with the outer bearings of said idler journals is a piece 207, upon a projection 208 of which is pivotally connected, intermediate its ends at 209, a finger or trip 210. The gear 630 is not directly connected with shaft 28, but is connected thereto through a clutch spring 211 which is secured at one end to an arm 212 fast on shaft 28, the other end of said spring being pivotally connected, as shown at 213, with a trip lever 214, which in turn is pivoted at 215 to a projection from arm 212. The clutch spring 211 normally engages the interior of gear 630 with a pressure sufficient to cause the shaft 28 to rotate with the gear 630, thereby operating the carrier chains 25 to forward bundles into the hoods. Whenever the finger 210 is oscillated so as to come into the path of the end of the trip lever 214, as indicated in dotted lines in Fig. 3, the resulting oscillation of said lever will withdraw the spring 211 from clutching engagement with gear 630 and instantly stop the rotation of shaft 28 and the consequent feed of bundles by the carriers.

I have shown two forms of means for oscillating the finger 210, that shown in Fig. 1 being the preferred form. As illustrated in Figs. 1 and 2, this device comprises a shaft 216 having thereon beater arms 85, the shaft 216 having the ends extended through slots 217 in the sides of hoods 16 and 17 and being journaled in arms 218 outside of said slots. The arms 218 are pivoted upon the band-cutter shaft 64. The band-cutter shaft 64 has thereon a sprocket wheel 219, from which, through sprocket chain 220 running over a sprocket wheel 221 fast on shaft 216, said shaft and the beater arms 85 thereon are positively rotated. It will thus be apparent that the beater arms are gravity held immediately above the delivery ends of carriers 25, as clearly shown in Figs. 2 and 4. Bundles of grain coming off of the end of the carrier 25 are engaged by the beater arms and forwarded to the band cutter, and, in turn, are thrown downwardly by the band cutter to the rollers 78 and 79, the band cutter at the same time cutting the bands. As the bundles pass under the beater arms 85 they will tend to raise the entire apparatus upwardly on the pivots of arms 218. One of the arms 218 is pivotally connected, as indicated at 222 in Fig. 1, with the end of finger 210 so that, as the beater 85 and the carrying arms 218 rise, the finger 210 will be swung on its pivot downwardly. Whenever said finger has been swung to a sufficient extent, caused by overfeed of bundles into the hood, it will come into the path of trip lever 214 and effect unclutching of shaft 28 from gear 630, with the result that movement of feeder chains 25 is stopped until the beaters 85 and band cutters 84 have cleared the bundles away from the opening, when the beater will descend by gravity, withdrawing finger 210 and the operation of carrier chains 25 will be resumed to continue the feed of bundles into the hood.

The effect of the beater governor above described is extremely beneficial because it absolutely prevents a permanent clogging of the feed. Unclutching of the carrier chains can only be effected by the presence of bundles beneath the beater arms, which, constantly engaging said bundles, tends to force them into the hoods and beneath the band-cutter knives. It follows, therefore, that whenever an overfeed has resulted in lifting the beater governor sufficiently to terminate feeding action, the governor itself removes the overplus of bundles so as to permit it to descend and again start action of the carriers. It comprises, therefore, an effective governor and forwarder, which renders the action of the feeding mechanism thoroughly automatic and dispenses with the necessity of stopping the machine to clean the rollers.

A modified form of governor is shown in Fig. 3 in which the finger 210 is connected outside of pivot 209 at 223 with a link 224, which extends through an arm 225 fast on a rock-shaft 226 and is connected to move arm 225 by means of a nut 27 on the end of link 224 and a spring 228 extending between arm 225 and a collar 229 on link 224. A shaft extends across each of hoods 16 and 17 and has fast thereon a series of wings 230 which may move between the band-cutter knives 84, and which tend to assume by gravity the full-line position shown in Fig. 3, an arm 231 engaging a stop 232 operating to limit movement in one direction.

The bundles of grain being fed into the hood 16 or 17 engage with their ends the wings 230 and, if the feed of such bundles is excessive, they will lift said wings, rocking shaft 226 so as to lift arm 225, thereby rocking finger 210 into the position indicated in dotted lines for engagement with finger 214 to unclutch gear 630 and stop feeding movement of carrier chains 25.

The operation of my device has been fully given in connection with the detailed description thereof. It will be apparent that a compact and efficient organization of band-cutter and feeding elements and governor mechanism therefor is effected, with a driving means which is simple and efficient in a high degree, and which permits entire freedom of movement of the carriers and hoods about their vertical axes.

I claim:

1. In combination with the threshing cylinder of a grain separator, a feeder comprising a rotatable casing in the form of a hood located directly above the threshing cylinder, an endless carrier for delivering bundles within the hood through which said bundles descend to the threshing cylinder, a band cutter within the hood adapted to act upon the bundles as they pass from the endless carrier, means for constantly driving the band cutter, means for driving the endless carrier, and means positioned within the hood so as to be engaged and moved by the bundles as the same enter the hood and while they are subject to the action of the band cutter knives for controlling the operation of said carrier driving means.

2. In combination with the threshing cylinder of a grain separator, a feeder comprising a rotatable casing in the form of a hood located directly above the threshing cylinder, an endless carrier for delivering bundles within the hood through which said bundles descend to the threshing cylinder, a band cutter within the hood adapted to act upon the bundles as they pass from the endless carrier, means for constantly driving the band cutter, means for driving the endless carrier, a frame pivoted to oscillate about the axial center of the band-cutter, a toothed feeder roller journaled in said frame and constantly driven from the band cutter, said roller being positioned so as to engage and assist in forwarding the bundles as the same enter the hood and adapted to move the frame upon its pivots when an excess of bundles is fed beneath the same, and means subject to the movement of said frame for controlling the operation of said carrier driving means.

In testimony whereof I affix my signature in presence of two witnesses.

ANDREW J. PETERSON.

Witnesses:
  Wm. Land, Jr.,
  H. A. Bowman.